A. MONARD, E. A. MOUTIER, & H. DUMARTIN.
APPARATUS FOR CONTROLLING RAILWAY SWITCHES AND SIGNALS.
APPLICATION FILED APR. 28, 1908. RENEWED OCT. 3, 1916.

1,235,912.

Patented Aug. 7, 1917.
7 SHEETS—SHEET 1.

WITNESSES:

INVENTORS:
Alfred Monard, Horace Dumartin
& Ernest Albert Moutier
By Attorneys,

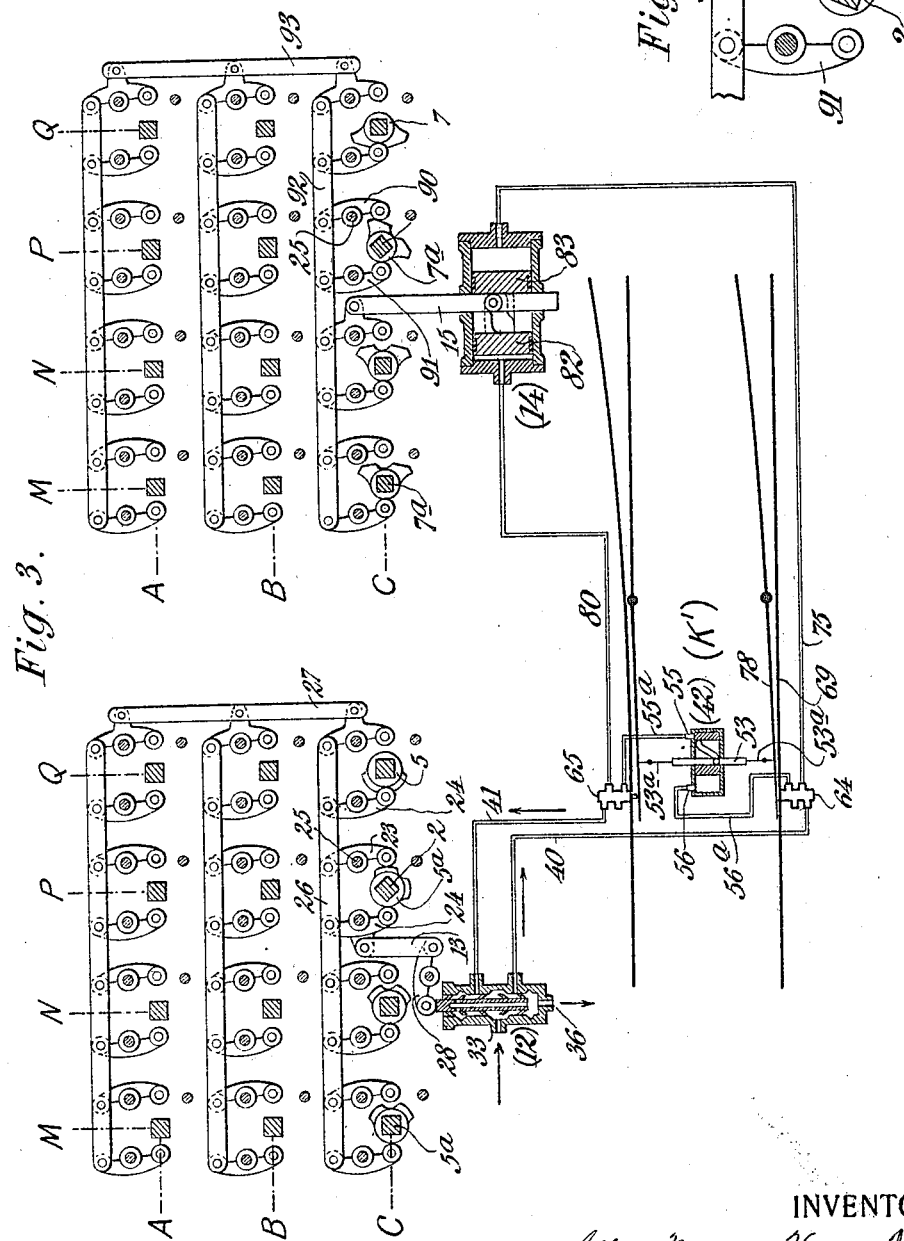

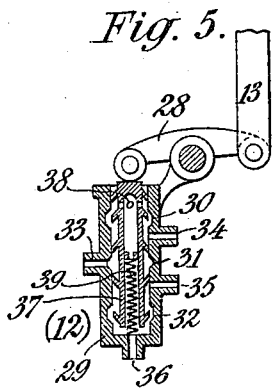
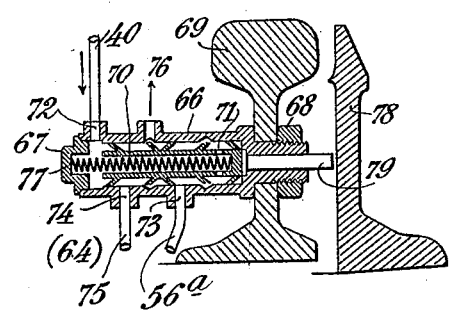
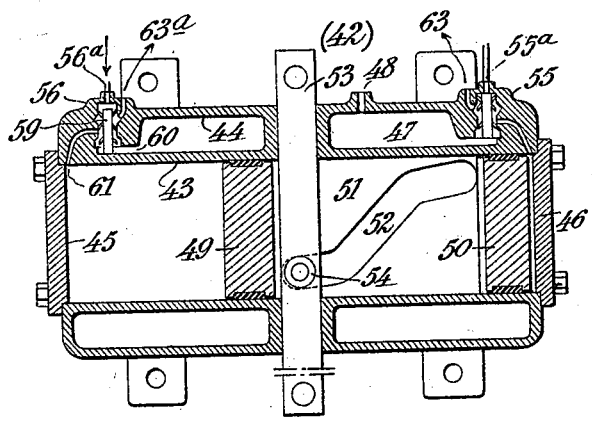
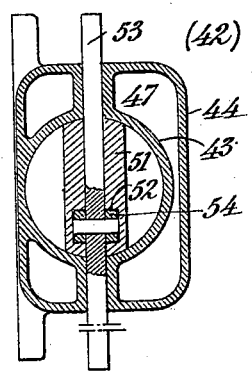
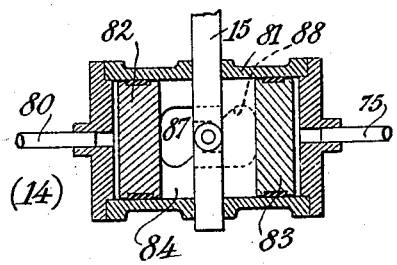
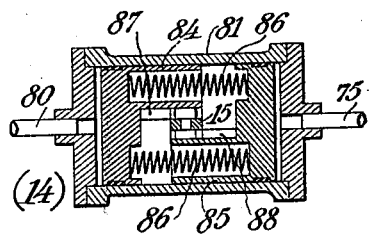

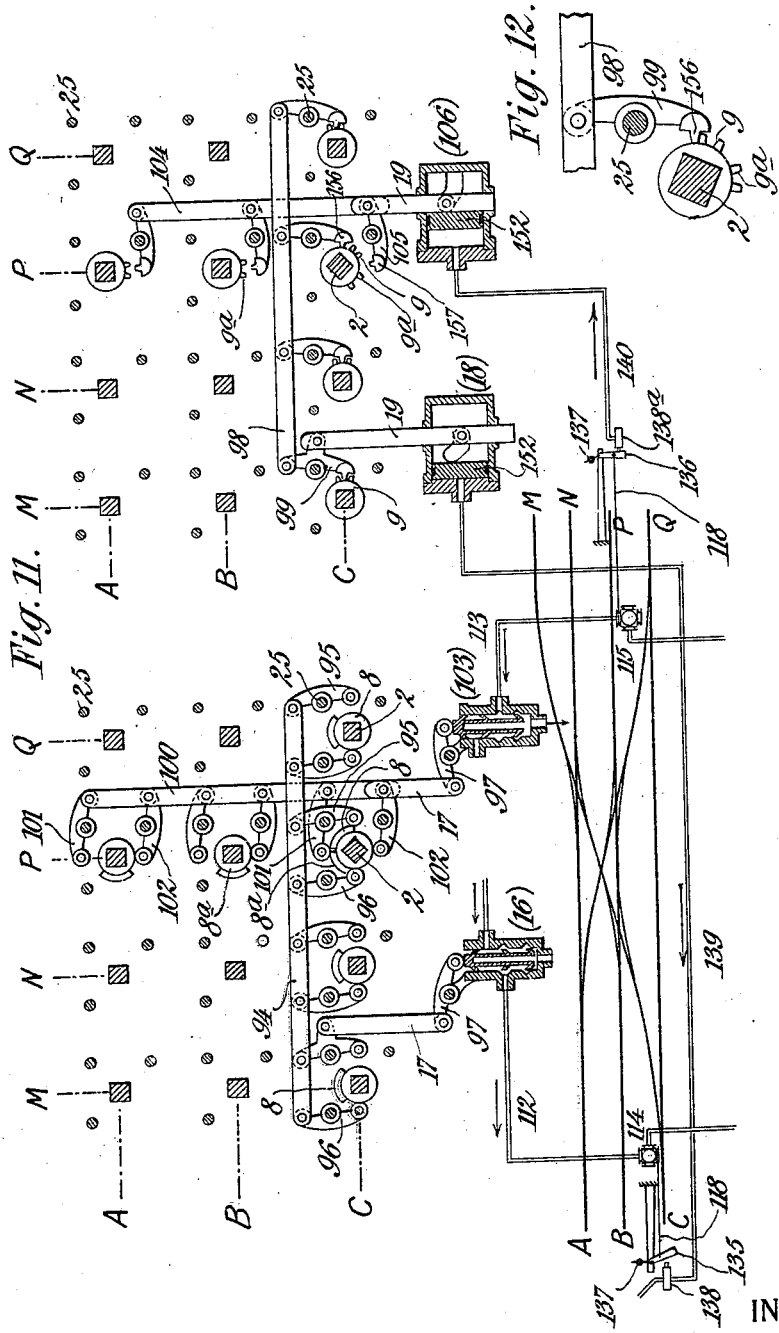

A. MONARD, E. A. MOUTIER, & H. DUMARTIN.
APPARATUS FOR CONTROLLING RAILWAY SWITCHES AND SIGNALS.
APPLICATION FILED APR. 28, 1908. RENEWED OCT. 3, 1916.
1,235,912.
Patented Aug. 7, 1917.
7 SHEETS—SHEET 5.
*Fig. 15.*
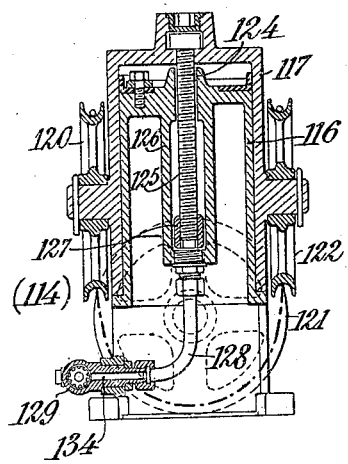
*Fig. 14.*
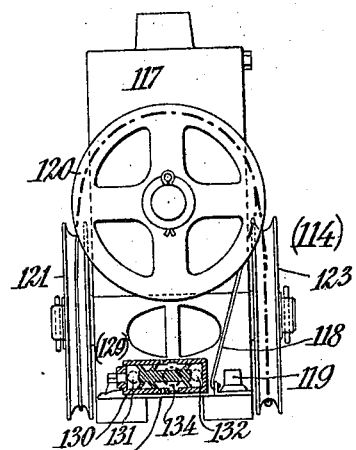
*Fig. 16.*
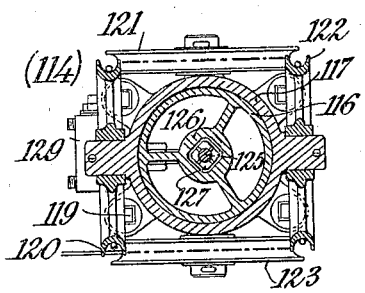
*Fig. 13.*
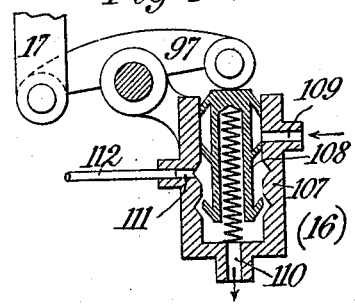
*Fig. 17.*
*Fig. 19.*
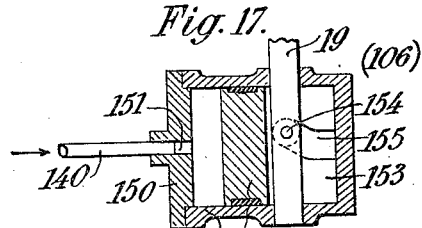
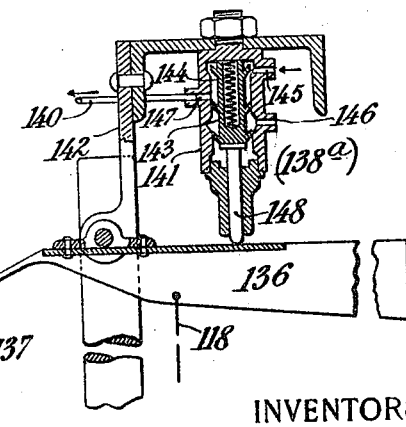
*Fig. 18.*
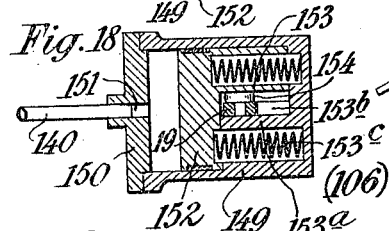
WITNESSES:
Rene Spuine
J. J. Wallach
INVENTORS:
Alfred Monard  Horace Dumartin
Ernest Albert Moutier
By Attorneys,
Fraser, Turk & Myers A. MONARD, E. A. MOUTIER, & H. DUMARTIN.
APPARATUS FOR CONTROLLING RAILWAY SWITCHES AND SIGNALS.
APPLICATION FILED APR. 28, 1908. RENEWED OCT. 3, 1916.
1,235,912.
Patented Aug. 7, 1917.
7 SHEETS—SHEET 6.
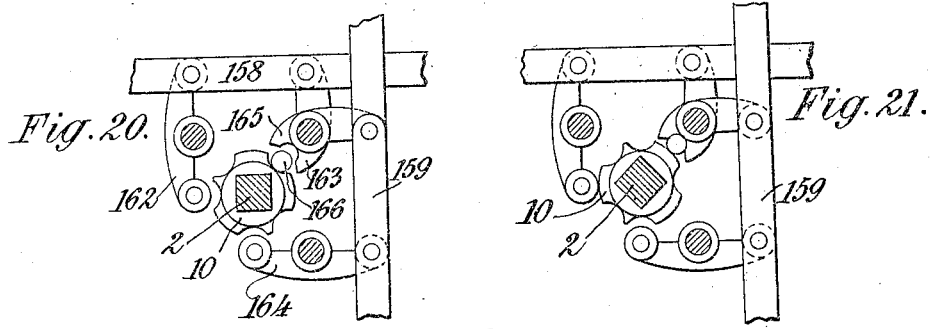
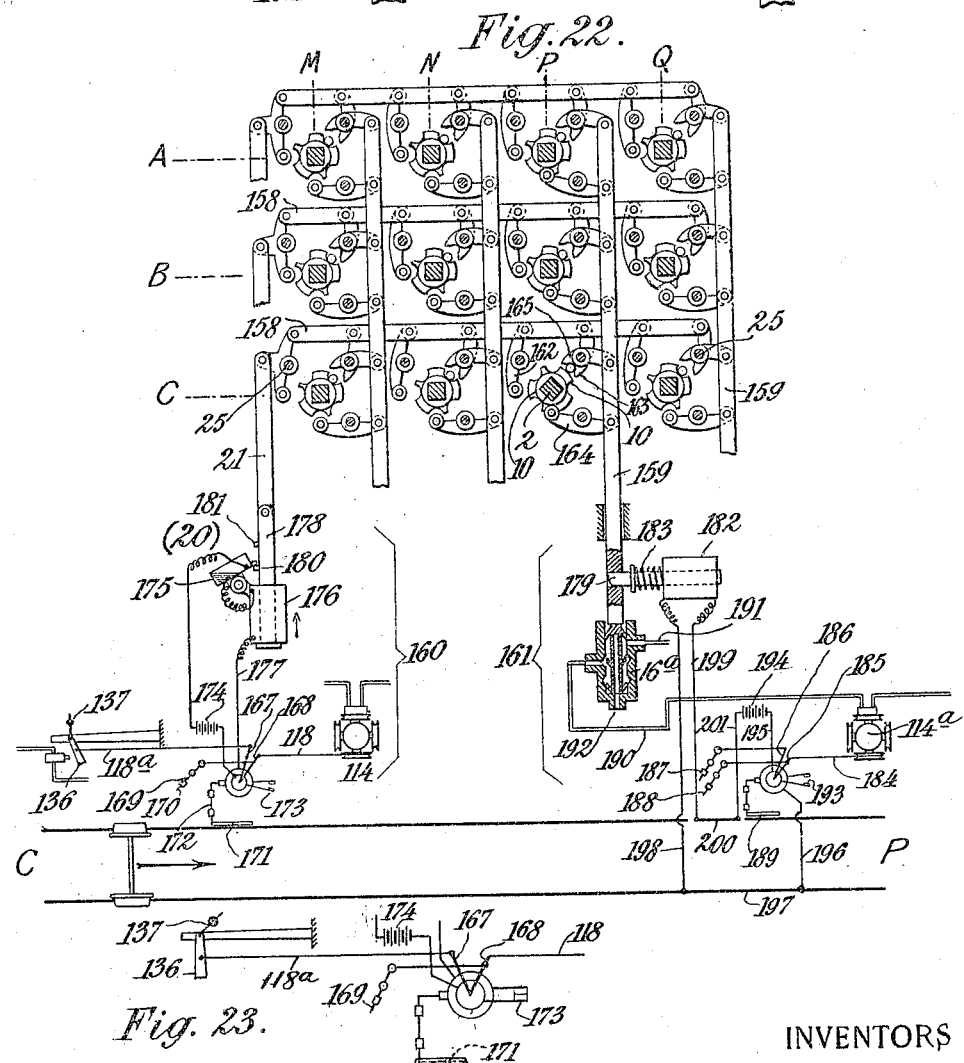
WITNESSES:
René Brunie
J. J. Wallace
INVENTORS:
Alfred Monard
Horace Dumartin & Ernest Albert Moutier
By Attorneys,
Fraser, Durk & Myers

UNITED STATES PATENT OFFICE.

ALFRED MONARD, ERNEST ALBERT MOUTIER, AND HORACE DUMARTIN, OF PARIS, FRANCE.

APPARATUS FOR CONTROLLING RAILWAY SWITCHES AND SIGNALS.

1,235,912.  Specification of Letters Patent.  Patented Aug. 7, 1917.

Application filed April 28, 1908, Serial No. 429,774. Renewed October 3, 1916. Serial No. 123,606.

*To all whom it may concern:*

Be it known that we, ALFRED MONARD, a subject of the King of Belgium, and HORACE DUMARTIN and ERNEST ALBERT MOUTIER, citizens of the Republic of France, residing in Paris, France, have jointly invented certain new and useful Improvements in Apparatus for Controlling Railway Switches and Signals, of which the following is a specification.

This invention relates to apparatus for controlling railway switches and signals of the same general class as that already described in our Patent No. 878,552 of February 11, 1908.

According to one feature of the invention the devices for locking and controlling the operation of the switches and signals are of purely mechanical construction, and auxiliary energy, that is electricity, air or water under pressure or vacuum is used exclusively for transmission to a distance of the movements performed at the interlocking apparatus or central table and for the transmission of the return indications from the individual switch points or signals to the corresponding locking devices at the table. This and other features of the invention are described in detail hereinafter, the separate features of novelty and combinations thereof being pointed out in the claims.

An embodiment of the invention is illustrated by the accompanying drawings wherein:

Fig. 3 is a diagram showing the controlling mechanism for one set of switch points, and the corresponding locking and return-indication mechanism.

Fig. 4 is a detail view showing the second position of one of the cams of Fig. 3.

Fig. 5 is a section through a valve operated by the action of the route key and adapted to open the passage for the pressure liquid to the admission valves of the motor which actuates the corresponding switch points.

Fig. 6 is a vertical cross-section through a return-indication valve which is operated by a switch point.

Fig. 7 is a longitudinal section through one of the motors which actuate the switch points.

Fig. 8 is a transverse section through the same motor.

Figs. 9 and 10 are longitudinal sections in planes at right angles to each other through a switch-controlled return-indication device adjacent to the central interlocking apparatus.

Fig. 11 is a diagram showing the control and operation of the two signals corresponding with the opposite directions over a single route.

Fig. 12 is a detail view of part of the mechanism of Fig. 11.

Fig. 13 is a vertical section through a valve connected with the central interlocking apparatus and adapted to control the admission of pressure liquid to the motor of the signal.

Fig. 14 is an elevation, partly in section, of a motor operating a signal rope.

Figs. 15 and 16 are respectively a vertical and a horizontal section of the same.

Figs. 17 and 18 are longitudinal sections in planes at right angles to each other through a signal-controlled return-indication device adjacent to the central interlocking apparatus.

Fig. 19 is a section through the signal-operated controlling valve mounted on the signal post.

Figs. 20 and 21 are detail views in two positions, of portions of the mechanism in Fig. 22.

Fig. 22 is a diagram showing how a route is locked when occupied by a train.

Fig. 23 is a detached portion of Fig. 22 showing the pedal mechanism thereof in another position.

Referring now to the embodiment of the invention illustrated, the switches and signals are operated by fluid pressure motors adjacent thereto, and the valves of these motors are operated by fluid pressure from the central cabin; and it is assumed that the pressure from the central cabin to the motor valves is transmitted by a practically incompressible liquid such as alcohol, glycerin or water filling the connecting pipes, such liquid moving very little in the pipes and thus entailing a very small expenditure of energy and a very small loss of the working fluid; and providing a very rapid action from one end of the pipe to the other; and it is assumed also that a similar medium is used for transmitting the return-indications from the switch points and signals to the cabin. Compressed air, supplied from a compressed air main or a central reservoir is preferably used for actuating the motors of the switches and signals. The valves of the motors are designed on the supposition that the pressure of the liquid is greater than that of the compressed air.

Figure 1:
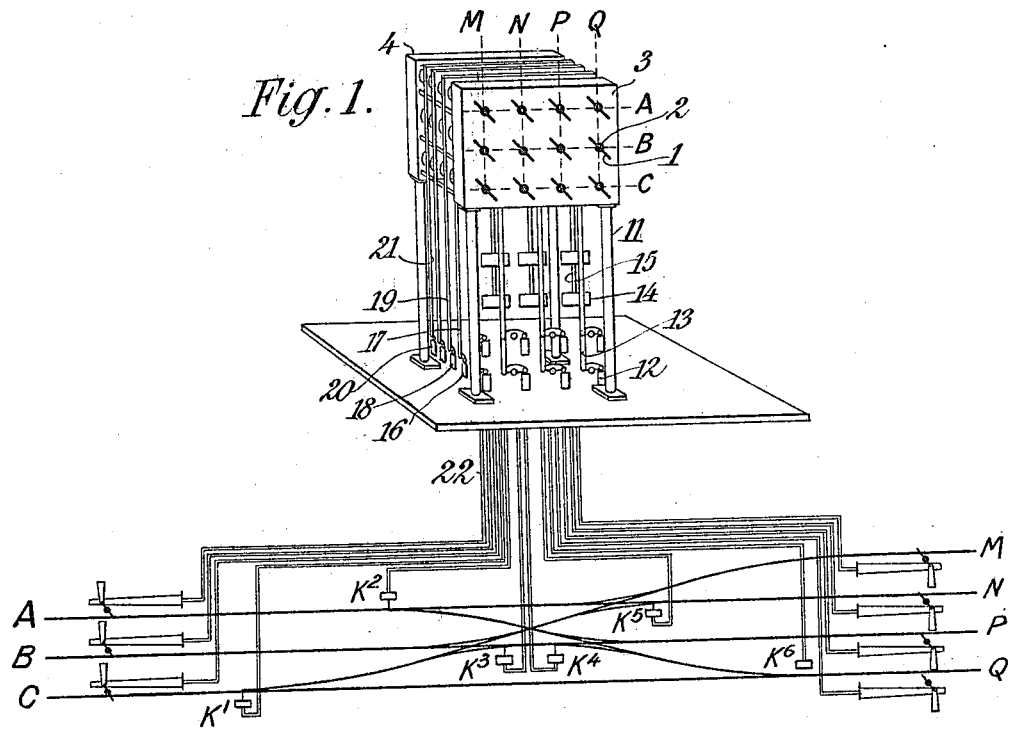
Figure 1 is a diagrammatic perspective view of the interlocking and controlling apparatus, and a diagram of the network of routes which it controls.

The central table or interlocking apparatus is in the form of a parallelopipedon, Fig. 1, with route keys 1 on the front face and with locking and controlling devices in the rear thereof in successive planes parallel with the front, each key being on the end of a route shaft 2 which passes through the several planes in which the locking and controlling devices lie. Fig. 1 shows also a network of intersecting tracks and switches ($K^1$, $K^2$, $K^3$, $K^4$, $K^5$ and $K^6$) communicating at one end with main tracks A, B and C, and at the other end with main tracks M, N, P and Q. The route keys 1 and their shafts are arranged in three horizontal rows (corresponding, as hereinafter described, to the three tracks A, B and C), and in four vertical columns (corresponding, as hereinafter described, to the four tracks M, N, P and Q). The corresponding reference letters are arranged alongside the front of the table in Fig. 1 and indicate the relations of the keys to the several tracks. At the intersection of row C with column P, for example, is the key which controls the route from track C to track P; and similarly for the keys at the other intersections. The keys stand normally in the 45° position shown. By turning any key to the right into a vertical position it will cause the setting of all the switches correctly for the corresponding route, with the two signals at the opposite ends of the route set for a train to travel over the route in one direction. By turning the same key to the left into a horizontal position the same switches will be operated in the same way, but the signals will be reversed so as to clear the route for a train to pass over it in the opposite direction.

The interlocking mechanism in the cabin (Figs. 1 and 2) comprises two parallel, fixed shaft-supporting frames 3 and 4, and to which are journaled the opposite ends of the several route shafts 2. Each shaft 2 carries cams and stops at various points in its length coöperating with levers connected to motor-operating valves, return-indication devices and locking arrangements. These levers and connected parts are described in detail hereinafter. Fig. 3 serves to illustrate the relative arrangements of the several cams and stops, and consequently of the several frames or sets of levers and bars with which the cams coöperate. Commencing at the left of the shaft 2 cams 5 and $5^a$ are mounted thereon, which serve to cause a movement of the switches. On any particular shaft there will be as many of these cams as there are switches on the route in question. For example, the route C P includes switches $K^1$, $K^3$ and $K^4$. The key shaft 2 for this route, therefore, will have cams 5 or $5^a$ in the planes of the sets of levers and bars which control these three switches. Other shafts will have similar cams in planes corresponding to the other switches. The locations of the planes in which lie the sets of levers and bars controlling the several switches are indicated by dotted lines $k^1$, $k^2$, $k^3$, $k^4$, $k^5$ and $k^6$, and the entire group of mechanisms which serve to effect the operation of the switches is designated generically as $6^1$. The levers and bars in one of these planes, $k^1$, are indicated at the left of Fig. 3.

Figure 2:
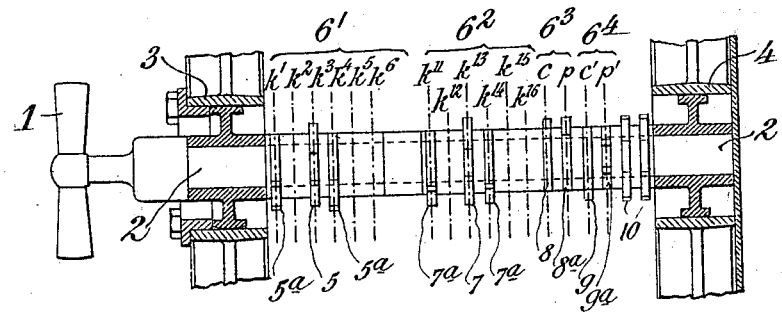
Fig. 2 is a side elevation of a route key illustrating chiefly the relative positions of the cams which operate the levers that control the several switches or signals situated on that particular route.

The next section of the shaft (Fig. 2) carries cams 7 or $7^a$ which coöperate each with a set of levers and bars constituting a part of the return-indication mechanism for one of the switches. There are six such sets of levers and bars, and they are arranged in six successive parallel planes indicated in dotted lines at $k^{11}$, $k^{12}$, $k^{13}$, $k^{14}$, $k^{15}$ and $k^{16}$, the mechanisms in these planes being designated generically by the numeral $6^2$. The mechanism in the first of these planes, $k^{11}$, is shown at the right in Fig. 3. The mechanism in the plane $k^{11}$ is part of the return-indication mechanism for the switch $K^1$; that in plane $k^{12}$, for switch $K^2$, etc. Since Fig. 2 shows the shaft of the route C P, the cams 7 and $7^a$ are arranged in the planes $k^{11}$, $k^{13}$ and $k^{14}$ corresponding to the three switches $K^1$, $K^3$ and $K^4$ which are on this route. Other shafts will have cams in the other planes for coöperating with the switches on their several routes.

Where there are more than six switches the number of sets of levers in the group $6^1$ and $6^2$ will be increased, and a reserve space is provided between $6^1$ and $6^2$ on each shaft for additional cams.

Next to the portion of the shaft carrying the cams of the return-indication mechanisms is a portion carrying cams 8 and $8^a$; the first for operating the signals at the ends of the tracks A, B and C, and the second for operating the signals at the tracks M, N, P and Q. A cam 8 actuates a set of levers which control the signal at A, the plane of such levers being indicated for better identification at $c$; and the cam $8^a$ actuates levers which effect the operation of the signal P, the plane of location of such levers being indicated at p. The group of mechanisms by which the signals are caused to move is designated generically as 6³. The lever systems for the planes c and p are indicated at the left of Fig. 11.

Next on the route shaft 2 are stops 9 and 9ª, the former coöperating with levers constituting a part of the return-indication mechanism for the signal at C, and the latter coöperating with levers constituting part of the return-indication mechanism for the signal at P, the planes in which these respective sets of levers are located being indicated in dotted lines at $c^1$ and $p^1$ respectively; and these signal return-indicating mechanisms being indicated generically by the numeral 6⁴. The lever mechanism in the plane $c^1$ and $p^1$ is indicated at the right in Fig. 11.

Next on the shaft are cams 10, 10 coöperating one with a set of levers relating to a train-controlled mechanism at the entrance of the route, and the other with levers pertaining to train-controlled mechanism at the exit of the route. Coöperating with each of these cams 10 is a set of levers and clutches for establishing a connection between the entrance mechanism and the exit mechanism of the route. A set of such levers and related mechanism is shown in Fig. 22 connected up to the route from C to P.

Fig. 1 shows in a very general way the parts of the apparatus which are located in the cabin. The keys, with their shafts and levers, are mounted upon the front and rear frames 3 and 4, as above explained, and these front and rear frames are supported on four corner posts 11. Below the shafts are the several devices which serve to communicate the motion of the shafts to the switches or signals, and the return-indications from the switches and signals to the shafts. Valves 12 control the switch-operating motors and are connected by rods 13 to the mechanism above. Switch-controlled return-indication cylinders 14 are connected to the mechanism above by rods 15. Signal-controlling valves 16 are connected to the mechanism above by rods 17. Signal-controlled return-indication cylinders 18 are connected by rods 19 to the mechanism above. Train-controlled entrance and exit clutching devices 20 are connected by rods 21 to the mechanism above. Ducts 22 are shown extending from the cabin to the ends of the several routes and to the several switches, to indicate in a general way the transmission of liquid pressure to these points from the cabin.

The keys 1 may be turned either to the right 45° into a vertical position, or to the left 45° into a horizontal position. In operating in either direction the key is given two successive movements in the same direction, each through an angle of 22½°. The first movement of 22½° causes an actuation of the switch motors to throw the switch points on the corresponding route, and at the same time locks the keys of all interfering routes against any movement whatever. The key which was advanced 22½°, however, cannot move farther until a return-indication is received showing that the switch points have been fully thrown; which return-indication causes the release of the said key and permits the operator to give it a further 22½° advance.

The second advance movement causes the actuation of the signal-operating motors to clear the route; that is, to put the signal at the entrance of the route at "safety," and the signal at the exit at "danger." The setting of the entrance signal at "safety" causes a return-indication which locks all other keys which relate to the same signal. The key which has been actuated, however, may be turned back sufficiently to bring the entrance signal again to "danger," whereupon the return-indication from this signal causes an unlocking of all the keys relating thereto. The actuated key, therefore, can be turned back, but all interfering keys are locked while the signal stands at "safety."

When a train enters the route it passes over a pedal (hereinafter described) arranged near one of the rails and depresses it; which shifts the signal at the entrance to "danger" and also locks the key of the route in question so that it cannot be turned back; this locking condition being maintained until the train passes over a similar pedal at the exit end of the route; whereupon the key of this route is released and can be turned back as before. The exit of the train from the route has no effect on the signal at this end. Consequently, the signals at both ends of the route are set at "danger", and the key must be turned back to its starting position before it can again clear the route. In turning it back to its starting position it releases all the keys of interfering routes, so that thereafter any desired route can be operated. The train-controlled exit mechanism operates as described to release its route key only in case the signal at the entrance of the route was properly set at "danger" when the train entered the route; the entrance mechanism and the exit mechanism being clutched together for this purpose as soon as a train enters the route, all as hereinafter described in detail.

*Operation and return indication of the switch points* (Fig. 3).—Each set of switch points is controlled from a set of levers 23, 24, mounted to oscillate on rods 25 running through the interlocking apparatus, the levers having their free ends opposite the cams 5 and 5ª on the shafts 2, and being connected at their opposite ends to each other through a system of horizontal and vertical bars 26 and 27 respectively, one of said levers being connected to a valve 12 by means of a rod 13 and lever 28. The only difference between the cams 5 and 5$^a$ is that the former are located on the left of their shafts and the latter on the right; so that the former will force the left-hand levers 24 outward from the shaft, and the latter will force the right-hand levers 23 outward from the shaft, thus causing opposite movements of the connecting rod 13 and reverse operations of the valve 12. Each of the cams 5 and 5$^a$ is double, so that the turning of the shaft either to the right or to the left from its starting position (shown for routes C M, C N and C Q) will force the lower end of its lever out. That is, whether a shaft be turned to the right or to the left, the effect will be the same upon the switch which is controlled by such shaft. The shaft for the route C P is shown in Fig. 3 turned 45° to the right from its position of rest. The shafts for routes C M, C N and C P, therefore, will throw the corresponding switch points (K$^1$) to the right, while the shaft for route C Q will throw the same switch points to the left. This is because (see Fig. 1) the routes C M, C N and C P require the train to depart from the straight track, while the route C Q requires it to go over the straight track.

The first effect of the turning of the shaft for route C P, as shown, is to lock the shaft of the interfering route C Q by forcing the end of the lever 24 into the notch between the two parts of the cam 5; these cams being so shaped that they not only force out the lower ends of the levers, but hold such levers and the connected bars locked, as is indicated by the cam 5$^a$ for route C P.

The valve 12 is shown in detail in Fig. 5, and comprises a cylinder 29 having three internal annular grooves 30, 31 and 32, a duct 33 through which it receives liquid under constant pressure, a duct 34 which leads to one side of the switch motor, and a duct 35 which leads to the opposite side of the motor; and an exhaust port 36. In the cylinder slides a hollow piston 37 having exhaust ports 38 in its upper end, and having five conical collars which form tight joints when they bear against the inner surface of the cylinder, but which permit liquid to pass them when they are in register with the grooves 30, 31 and 32. The piston 37 carries a spring 39 which holds it up in the middle position, as shown in Fig. 5.

The piston is moved downward or upward as the rod 13 is raised or lowered by the cam mechanism above described. In Fig. 3 it is shown shifted to its upper position as a consequence of the turning of the key for the route C P. The liquid under pressure passes from the inlet 33 to the outlet 35, and thence into conduit 40, as shown by the arrow. The port 34 is put in communication with the exhaust through the ports 38 in the piston, so as to permit a back-flow therethrough of any liquid which in a previous position may have been forced into the communicating duct 41. This operation occurs as a result of turning the shaft for route C P either to the right or to the left. If the shaft for C P were in normal position, however, and the shaft for route C Q were turned, it would cause a downward movement of the piston in the valve 12 and an admission of liquid under pressure to the conduit 41, and would put the conduit 40 in communication with the exhaust 36. As the liquid under pressure is admitted to the conduit 40 or to the conduit 41 respectively, the switch is operated in one direction or the other.

The conduits 40 and 41 communicate (through the intermediation of switch point controlled valves hereinafter referred to) with opposite ends of a switch-actuating motor 42 shown on a larger scale in Figs. 7 and 8.

The motor designated as a whole by the numeral 42 comprises a cylinder 43 drilled throughout its length and surrounded by a jacket 44 and closed at its ends by plates 45 and 46. The chamber 47 formed by the jacket serves as a reservoir of compressed air which enters at 48 from a compressed air main. Within the cylinder move two tightly fitting pistons 49 and 50 connected together by a pair of webs 51 in which are slots 52. At right angles to the axis of the cylinder slides a bar 53, on each face of which is a roller 54, the rollers engaging in the slots 52 so that as the pistons and webs 51 are reciprocated in the cylinder the bar or rod 53 is reciprocated in a transverse direction. The bar 53 is connected at its opposite ends to links or rods 53$^a$ (Fig. 3) which communicate the motion of the bar to the opposite tongues or points of the switch.

Admission valves 55, 56 (Fig. 7) are located at opposite ends of the motor cylinder, and these valves communicate with ducts 55$^a$ and 56$^a$ respectively. Each admission valve comprises a piston 59 having three collars and moving in a cylindrical bore formed with two annular grooves. The fluid pressure from the chamber 47 enters the valve chamber at the port 60 and passes to the end of the cylinder through the port 61. The controlling pressure from the conduit 40 (Fig. 3) enters the valve 56 through the duct 56$^a$, and the controlling pressure from conduit 41 enters the valve 55 through 55$^a$. The exhaust is through duct 63 of valve 55 or 63$^a$ of valve 56. In Fig. 7 the valve 55 is in its position of rest with the end of the motor cylinder open to the exhaust, and the air pressure chamber 47 is cut off. At the opposite end of the cylinder, however, the valve 56 has been operated by water pressure coming through the duct 58 which has shifted the valve piston 59 so that the pressure of air from the chamber 47 passes through the valve and the duct 61 into the end of the cylinder; the exhaust port 63 being cut off. The piston 49 in the cylinder has then been advanced to the position shown, and the bar 53 has shifted, so that, as shown in Fig. 3, it has forced the lower switch tongue against the stock rail and has withdrawn the upper switch tongue from the stock rail.

The controlling pressure, of the water or other liquid, in the ducts 57 and 58, is greater than the air pressure in the chamber 47, so that the water pressure shall push inward the pistons of the valves, as described. When the controlling pressure in the duct 58 ceases, the valve piston 59 therein will be returned by the air pressure on its inner end to the position of rest, and the motor cylinder will be put in communication with the exhaust. The switch points, however, will remain locked in the positions to which they have been moved by the bar 53.

The shape of the slot 52 in the webs carried by the motor piston is such as to substantially lock the bar 53 at the end of its stroke in either direction. The slightness of the inclination given to the ends of the slots causes the slides 52 to act with considerable power in forcing the switch points against the stock rails or in removing them therefrom.

If the liquid pressure passed directly from conduit 40 to duct 58 (or from 41 to 57) the manipulation of a route key as described above would simply cause a shifting of the switch points by their motor to one side or the other. But for the purpose of securing a return-indication in the cabin the liquid is passed in each case through an intermediate return-indication valve. Such valves are indicated in Fig. 3 at 64 and 65; one of them, 64 by way of example, being shown in section in Fig. 6. It comprises a cylinder 66 having three internal annular grooves, the cylinder being closed at one end by a stopper 67 and fixed by the nut 68 at the opposite end to the stock rail 69. Within the cylinder is the valve piston 70 having five collars arranged as shown, and axially bored and perforated at 71 to open communication between the port 72, by which the liquid pressure arrives through the conduit 40, and one or other of the ports 73 and 74. The port 73 is connected with the pipe 56ª leading to the motor, and the port 74 is connected with a pipe 75 leading to the cabin, as hereinafter described. Port 76 is the exhaust, and in alternate positions of the valve piston is drawn into communication with the ports 74 and 73. The valve piston 70 is held in the position shown in Fig. 6 by a spring 77 so long as the switch point or tongue 78 is away from the stock rail 69. In this position liquid under pressure arriving through the conduit 40 passes through the bore of the hollow piston and through the perforations 71 therein to the duct 56ª, and thence to the valve 56 of the switch point motor 42.

The motor is thus operated and shifts the switch points until the point 78 (Fig. 6) is pressed home against the stock rail 69. The tongue 78 bears against the rod 79 which slides in the end of the valve and pushes the valve piston back against its spring. This brings the duct 73 and the switch point motor into communication with the exhaust 76 and admits liquid under pressure from the port 72 to the conduit 75 for the return-indication device in the cabin.

Thus the liquid from the valve 12, which is actuated directly from the central interlocking mechanism, passes through the return-indication valve 64 to the motor 42 if the switch points are not in the desired position; the motor shifts the points to the desired position, and thereafter the pressure on the motor is released and the liquid under pressure is caused to flow to the return-indication device. Or if, when the liquid arrives at the return-indication valve 64, the switch points are already in the desired position there will be no flow of the liquid to the switch motor, but the flow will be directed immediately to the return indication devices in the cabin. The motor 42, therefore, does not operate uselessly and is not even subjected to pressure when its operation is not required. When it does operate it remains under pressure of the liquid only for such time as is necessary to move the switch points.

When the switch is operated in one direction the return-indication pressure passes on from the valve 64 into the conduit 75, and when the switch is operated in the opposite direction such pressure passes through the return-indication valve 65 to the conduit 80. These two conduits lead into opposite ends of a return-indication device indicated as a whole by the numeral 14, and the construction of which in detail is illustrated in Figs. 9 and 10. The return-indication device comprises a cylinder 81 closed at its ends, with ducts in the opposite ends connected to the respective conduits 80 and 75; within which cylinder are two separate pistons 82 and 83 formed with overlapping webs 84, 85 respectively, and normally separated by means of springs 86. The adjacent faces of the overlapping portions of the pistons are formed with grooves 87 and 88 respectively, of the shape indicated in Fig. 9. The rod 15 which extends from this cylinder to the key shafts and adjacent mechanism above is provided with a guide roller fitting in each of the grooves 87 and 88. When the pistons are separated by their springs, as shown in Fig. 9, the groove 87 of the piston 88 holds the rod 15 up to its middle position, and the groove 88 of the piston 83 holds the rod down to its middle position; so that it is locked in this position. When pressure enters through the conduit 80 and forces in the piston 82, the rod 22 is released to permit downward movement. Or when pressure enters through the conduit 75 and forces the piston 83 in the rod is released to permit upward movement. In Fig. 3 for example, the pressure passing through the conduit 75 has pushed in the piston 83 and released the rod 15 to permit upward movement thereof.

The return-indication mechanism in the cabin comprises right and left-hand levers 90 and 91 respectively, mounted on the rods 25 which pass through from front to rear of the interlocking mechanism, and all connected together by horizontal bars 92 and vertical bars 93; one of the levers having an arm connected to the upper end of the rod 15. Coöperating with the levers are cams 7 and 7$^a$, right-handed for the routes C M, C N and C P, because for these routes the switch has to be shifted to the right, and left-handed for the route C Q because for this route the switch must be shifted to the left.

In Fig. 3 the shafts for routes C M, C N and C Q are shown in their positions of rest, and the shafts for route C P turned full 45° to the right.

As previously explained, this complete advance of 45° is made in two steps. The first step of 22½° is shown in Fig. 4. This movement is sufficient to operate the valve 12, which causes the actuation of the switch. But when the shaft has turned to this extent the upper branch of the double cam 7$^a$ bears against the lever 90 and prevents any further movement of the shaft because the lever and all its connected bars and levers are locked against movement by the rod 15 which is held locked in its middle position by the separated pistons 82 and 83 of the return-indication cylinder 14. As soon as the switch is thrown fully, however, the return-indication comes through the conduit 75, presses in the piston 83, releases the rod 15 for upward movement, and thus permits the further advance of the shaft 2 to its final position, as shown in Fig. 3.

Since it is the second advance step of the shaft which throws the signal, the signal cannot be thrown until there is a return-indication showing that the switch has been entirely thrown. Furthermore, the cams 7 and 7$^a$ are so shaped that an inward pressure by the end of their levers can bring the cams back to their first advanced position. Therefore, if there should be a subsequent displacement of the switch points, the liquid pressure in the return-indication cylinder 14 would be cut off, the springs would force both pistons to their outer positions, and the rod 15 would be brought to its middle position and locked there, at the same time forcing the end of the lever 90 against the cam 7$^a$ to turn the route shaft back to its first advanced position and to cause the return of the signal to "danger." The symmetrical double profile of each cam 7 and 7$^a$ has the same function as the double profiles of the cams 5 and 5$^a$. That is, these cams work in the same way whether the shaft be turned to the right or to the left; the signal mechanism alone being dependent on the direction in which the shafts are turned.

In brief, the operation of the switch throwing and return-indication mechanism is as follows, referring particularly to Fig. 3. The turning of the shaft 2 for the route C P 22½° to the right forces out the right-hand lever 23. This first forces in the left-hand levers 24 so as to lock the route shafts of all interfering routes, and forces down the rod 13, lifting the piston of the valve 12. This releases any back pressure in the conduit 41 and admits liquid under pressure to the conduit 40. This liquid, passing to the valve 64, is transmitted through conduit 56$^a$ to one end of the motor 42 (supposing the switch points to be in a position opposite to that desired), opens the valve at that end of the motor and admits air pressure thereto. The motor then throws the switch, and as soon as the switch tongue 78 is fully thrown the piston of the valve 64 is shifted so as to release the pressure on the motor 42 and to admit pressure to the conduit 75. The cam 7$^a$ prevented a further advance of the key shaft 2 of the route C P by striking against the lever 90, which was held in a vertical position (as in Fig. 4) by the locking of the rod 15 in the return-indication cylinder 14. The pressure in the conduit 75, however, releases the rod 15 for upward movement, after which the route shaft is further advanced by the operator to the end of its 45° stroke.

*Operation and return-indication of the signals.*

Fig. 11 shows the signal mechanism for the route C P. For one end of the route, say the end C, there is in the interlocking apparatus or table a horizontal bar connected to right and left-hand levers 95 and 96 respectively, connected to the rod 17, which, through a lever 97, actuates the valve 16 which controls the motor of the corresponding signal; and for the same end C of the route there is in the interlocking apparatus or table a similar horizontal bar 98 connected to levers 99, one of which is connected by the rod 19 to the return-indicating cylinder 18 of the corresponding signal.

For the opposite end of the route, P, there is a vertical bar 100 connected to upper and lower levers 101 and 102 respectively, the lower end of which is connected through a rod 17 and lever 97 with a valve 103 identical with the valve 16, but arranged to control the motor which operates the signal at P. Similarly, there is for the signal at P a vertical bar 104 carrying rocking levers 105 and connected at its lower end to a rod 19 extending to a return-indication cylinder 106 identical with that shown at 18, but connected with the signal at P.

These signal-operating and indicating mechanisms are repeated for each of the several signals. For the signal at A there is a horizontal bar like 94, with levers in line with the shafts in the row A, one of the levers of the system being connected to a valve like 16 for causing the operation of the signal motor at A; and for the same signal there is a return-indication mechanism comprising a horizontal bar like 98 with a system of levers in line with the route shafts in the row A, and with connections to a return-indication cylinder like 18. The same mechanism is repeated also for the signal at B, the horizontal bar and levers of the operating mechanism and the horizontal bar and levers of the return-indication mechanism running alongside the route shafts in the row B. The vertical bar 100 and its connected devices for controlling the operation of the signal is repeated for each of the signals M, N and Q, being arranged adjacent to the route shafts in the corresponding columns M, N and Q, and each being connected to a separate valve like 16 for insuring the operation of its particular signal. Similarly, the vertical bar 104 and its levers are repeated in positions adjacent to the route shafts in the columns M, N and Q so as to furnish return-indications of the signals at M, N and Q respectively. For clearness of illustration there are illustrated in Fig. 11 only the signals and the operating mechanism therefor, and return-indications therefrom, for the route C P.

The signals are of the usual type which tend to return always to "danger" through the action of a spring or weight, and are held at "danger" unless, and until, they are thrown by the operating mechanism to "safety." The valve 16 or the valve 103 serves to cause an actuation of the motor to throw the signal to "safety." One of these valves, 16 for example, is illustrated in detail in Fig. 13. It comprises a cylinder 107 having two internal annular grooves, in which cylinder is a piston 108 having three collars, one on each end and one at the center of its length. The liquid under constant pressure enters the cylinder through port 109. The exhaust is through port 110. The port 111 leads to a conduit 112 which leads at the other end to the signal-operating motor. In Fig. 11 the valves 16 and 103 are shown leading respectively through conduits 112 and 113 to signal motors 114 and 115 at the ends C and P of the route. The valve piston is operated by a lever 97, as previously explained. For the valve 16 (Fig. 11) the piston is down and water pressure is transmitted through the conduit 112, and the motor is operated to pull down the signal to "safety." For the valve 103 the piston is elevated and the conduit 113 is in communication with the exhaust port 110, so that the motor is not operated and the signal has returned automatically to "danger."

One of the signal motors, 114 by way of example, is illustrated in Figs. 14, 15 and 16. It comprises a fixed piston 116 mounted on a suitable base, and a cylinder 117 sliding up and down on the piston. The signal operating rope 118 has one end fixed to a post 119 on the base of the motor, and passes over pulleys forming a speed multiplying tackle, and thence to the signal. Two of these pulleys are mounted on two opposite sides of the base of the motor, and two others at right angles to the first pair are mounted on opposite sides of the cylinder and move with it. The rope 118 passes first up over movable pulley 120 on one side of the cylinder 117, thence down and under pulley 121 on one side of the base, thence up over pulley 122 on the opposite side of the cylinder from 120, and down and under pulley 123 on the base of the motor opposite pulley 121; and thence to the signal. The raising of the cylinder therefore pulls the rope at a quadruple rate, and the lowering of the cylinder slacks the rope at the same rate.

The motor illustrated is operated directly by compressed air carried in a reservoir within the hollow piston or in any other convenient place, the admission and exhaust of such air being controlled by a valve operated by water pressure as described for the switch motor. The use of such a primary and secondary motive power arrangement is important in operating the switch points because there may be a number of switches on a route and to operate them all directly from the same source of pressure would mean the operation of one after another, with a considerable lapse of time between the first and the last, whereas with the secondary motive power arrangement the liquid or main pressure can actuate the valves of the several switch motors nearly simultaneously, and all the switches can be thrown nearly simultaneously. As the route signals cannot be thrown to direct a train onto a route until after the switches are all properly set, the practically simultaneous operation of the switches permits a very quick clearing of the route to a train waiting to enter the same. But as there are only two signals for each route the saving of time by the use of a secondary motive power is not so important.

The air under pressure (admitted under control of the liquid pressure-actuated valve herinafter described) enters the upper end of the cylinder and lifts the latter when the signal is to be thrown to "safety," and is exhausted and allows the cylinder to descend by its own weight when the signal is to be allowed to return to "danger." The air under pressure is admitted and exhausted through a passageway 124 around a plunger 125 attached to the cylinder, and extending into the hollow stem 126 of the piston, the plunger 125 carrying an adjustable collar 127 for limiting the upward movement of the cylinder. The space within the hollow stem 126 is supplied or exhausted through a conduit 128 leading to a valve indicated as a whole by the numeral 129. This valve comprises a cylinder 130 having a port 131 through which enters water under pressure, a port 132 through which enters air pressure from the reservoir, and an exhaust port 133. A port 134 leads to the conduit 128 (see Fig. 15). The cylinder is internally grooved in the plane of the port 134, and has a piston provided with collars, as shown. The piston is forced to the right when the water pressure, which is greater, is admitted at 131. This opens communication between the air reservoir port 132 and the motor port 134, and operates the motor. When the liquid pressure through the port 131 is relieved, the air pressure entering at 132 forces the valve piston back to the left, cuts off the supply of air to the motor, and opens the port 134 of the latter to the exhaust 133, thus allowing the motor cylinder to fall.

The signals are indicated diagrammatically at 135 and 136 in Fig. 11 for the opposite ends of the route. Each signal comprises a semaphore arm 136 connected with the rope 118 leading to the motor and normally held in the raised "danger" position by a weight 137.

The manner in which the route shafts control the signals is as follows, referring to the left-hand portion of Fig. 11. The route shafts 2 carry in the plane of the levers 95 and 96 cams 8 normally on the top of the shaft. They also carry in the plane of the levers 101 and 102 (which are in the rear of the levers 95 and 96), cams 8ª normally at one side of the shafts. When the cams are in the normal positions referred to, the levers will be free and the valves 16 and 103 will both stand with their pistons elevated so as to exhaust the conduits leading from the two signal motors, and the two signals will thus stand at "danger". In the drawing we have shown the shaft for route C P turned 45° to the right. This will cause a shifting of the bar 94 to the left and an operation of the valve 16 to admit liquid under pressure to the conduit 112 and throw the signal 135 to "safety", thus permitting entrance of a train at this end of the route. The same operation of the route shaft for C P will throw the vertical bar 100 downward, or will hold it downward, so that the valve 103 will be held in its normal position, exhausting from the signal motor at P and leaving this signal at "danger". If instead of turning the said shaft to the right we had turned it to the left, these operations would be reversed. The valve 16 would be thrown to the exhausting position or would be held in such position by the cams 8 actuating the left-hand lever 96, so that the signal at C would go to "danger"; and the cam 8ª would act on the lower lever 102 and raise the vertical bar 100 so as to set the valve 103 to operating position and cause the setting of the signal at P to "safety"; thus admitting a train at the end P of the route. The cams are arranged to have a considerable idle movement, striking and throwing out the levers only near the end of the 45° stroke of the shaft, and after such an advance a very slight backward turn of the shaft is sufficient to release the levers and allow the valves and signal motors to return to their normal positions, and both signals to return to "danger". The purpose of this is explained hereinafter in connection with the signal return-indication mechanism. It has previously been explained that the turning of the route shaft either to the right or to the left causes an identical operation of the switches on the route, and it will now be clear that these reverse movements of the key and shaft serve to set the route signals for travel in alternate directions.

When any signal is thrown to "safety" a return-indication thereof is received in the interlocking apparatus by means of valves actuated directly by the signal arms and controlling the transmission of liquid pressure to cylinders in the cabin which operate locking devices within the central table.

The return-indication valves at the opposite signals are indicated at 138 and 138ª respectively, and communicate through conduits 139 and 140 with the cylinders in the cabin. One of the return-indication valves, 138ª by way of example, is indicated separately in Fig. 19. The valve cylinder 141 is mounted on arm 142 on the signal post, and has two internal annular grooves coöperating with three collars on a reciprocable piston 143 pressed downward by a spring 144. Liquid under pressure enters through port 136

145. An exhaust port 146 is located at the lower end of the cylinder, and at an intermediate point is a port 147 communicating with the conduit 140 above referred to. A sliding rod 148 projects out of the lower end of the valve and is struck and raised by the arm 136 of the signal when the latter is elevated to "danger". In this, which is the normal position, liquid under pressure is admitted to the conduit 140. When the arm is pulled down by the rope 118 to the "safety" position, however, the piston of the valve moves downward, cuts off the pressure liquid from the conduit 140, and opens communication between the latter and the exhaust port 146.

The water under pressure from the conduits 139 and 140 passes respectively to the cylinders 18 and 106. One of these, 106 by way of example, is shown in Figs. 17 and 18. It comprises a cylinder 149 closed at one end and having at the opposite end a head 150 in which is a port 151 communicating with the conduit 140. In the cylinder slides a piston 152 having an extension 153 overlapping a similar extension 153$^a$ from the fixed end of the cylinder, with a space 153$^b$ through which passes the rod 19 extending to the mechanism above. Springs tend to throw the piston to the left-hand end of the cylinder. The water pressure from the conduit 140 normally presses the piston to the right. The rod 19 carries a roller 154 traveling in a cam groove 155 in the extension of the piston, so that as the latter shifts to the right the rod 19 is raised, and as the piston shifts to the left the rod 19 is lowered. Returning to Fig. 11 it will be seen that for the signal 135, which is at "safety", the water pressure is cut off from the cylinder 18 and its rod 19 is down. For the signal at P standing in its normal "danger" position, the water pressure is admitted to the cylinder 106 and its rod 19 is raised.

The movement of the signal 135 to "safety", and the consequent lowering of the corresponding rod 19, serves to lock all route shafts in the row C, these being the shafts by which the signal at C is controlled. (The switch-actuating mechanism served to lock only the shafts of interfering routes, and this signal-controlling mechanism serves to lock the shafts of all routes using the signal which has been actuated). To effect this the shafts 2 are provided, as shown at the right of Fig. 11, with double stops 9 which coöperate with teeth 156 on the ends of the levers 99, which are connected together by horizontal bar 98. The shafts are also provided with similar double stops 9$^a$ in the plane of levers 105 and coöperating with teeth 157 on the ends of the latter; these levers being connected by a vertical bar 104. The lever systems are connected respectively to the rods 19 of the return-indication cylinders 18 and 106. Normally the levers are held away from the stops on the route shafts, as shown for the column P, by reason of the water pressure in the return-indication cylinder which exists when the signal is at "danger". When the signal moves to "safety", however, the piston of the return-indication cylinder 18 is relieved of the water pressure and is retracted by its spring so as to pull down the rod 19 and throw the pins 156 into engagement between the stops 9 on all the route shafts in this row except the one which has been turned. The route shaft for C P has been turned, and its stop pins 9 have advanced beyond the tooth 156 before the return-indication has been received and the several teeth 156 thrown inward. It is for this reason that the signal operation does not take place until near the end of the 45° stroke of the shaft; the cams 8 and 8$^a$ being arranged to strike their levers, as previously explained, only near the end of the stroke. In fact, the full stroke carries the stop pins 9 past the range of the tooth 156 before the signal-actuating mechanism is operated, as shown in Fig. 11.

The route shaft which has been advanced may therefore be turned back a substantial distance, to the point shown in Fig. 12, before it strikes the tooth 156, and this backward movement is sufficient to restore the signals to their normal "danger" position. This mechanism therefore insures that all other shafts controlling the same signal shall be locked against movement in either direction and may not be unlocked until the shaft which was actuated shall be turned backward sufficiently to restore its entrance signal to "danger."

*Control by the train.*—As stated above, the first turning of a route key locks the switch-operating parts of the interlocking mechanism for all interfering routes, that is, for all routes which include any of the switches on the route which is to be cleared. And, after all the switches on a route have been set and return-indications have been received therefrom, the further movement of the route key sets the entrance signal at "safety" and leaves the exit signal at "danger". And this further movement of the key locks the interlocking mechanism for all keys pertaining to the signal which has been set at "safety", leaving it possible, however, to turn back the route key which has been advanced. Now, when a train enters the entrance end of the route it shifts the signal at this point to "danger" and locks also the route key which has been advanced, so that it cannot be turned back (and thus disarrange the switches). There is a train-controlled exit mechanism which, by the turning of the key, has been clutched to the entrance mechanism; and when the train passes out at the exit it operates this mechanism and unlocks the key of the route so that it may be turned back. The cams of this train-controlled entrance and exit mechanism are shown separately in Figs. 20 and 21, and the track mechanism is shown diagrammatically in Figs. 22 and 23, as well as the relation thereof to the interlocking mechanism. The illustration in Fig. 22 is complete for only the route from C to P, including the horizontal bar 158 pertaining to the entrance mechanism at C, and the vertical bar 159 pertaining to the exit mechanism at P. Horizontal bars and connected devices within the interlocking apparatus are shown for the entrance mechanisms at B and A in relation to the corresponding rows of route shafts 2, and vertical bars and similar connected devices for the exit mechanisms M, N and Q in the corresponding columns of route shafts; but the tracks constituting these routes and the entrance and exit mechanisms thereof are omitted for the sake of clearness. There is an entrance mechanism indicated as a whole at 160, at each of the points A, B and C corresponding to the three horizontal bars 158 in the interlocking apparatus; and an exit mechanism, indicated as a whole by the numeral 161, at each of the points M, N, P and Q corresponding to the four vertical bars 159. Also, there must be an exit mechanism like 161 at each of the points A, B and C of the tracks, connected to horizontal bars in the interlocking mechanism, and an entrance mechanism like 160 at each of the points M, N, P and Q of the tracks connected to vertical bars in the interlocking mechanism; these horizontal and vertical bars, and the levers and cams pertaining thereto, being arranged similarly to those illustrated and in a separate group immediately behind them. The locations of the two groups are indicated by the two cams 10, 10 (Fig. 2), but are not separately illustrated in detail since they are duplicates of each other.

Fig. 20 shows one of the cams 10 when the route key shaft 2 is at rest. Fig. 21 shows the same turned to the right 45°. Each of the horizontal bars 158 is provided with a lever 162 and a pivoted jaw 163 for each of the cams 10. Each vertical bar 159 has similar levers 164 and jaws 165. Each cam is so shaped that in its position of rest it has locking notches facing the ends of the levers 162 and 164, the levers being out of engagement with said notches. By a shifting of the horizontal rod to the left its levers 162 will enter notches in the cams and lock the shafts against rotation; and similarly, a downward movement of the vertical bar 159 will cause the ends of its levers 164 to enter notches in the cams and lock them. Located between the jaws 163 and 165 is a ball 166 lying, in the position of rest, in a notch between two projecting portions of the cam and adapted to be forced outward by the rotation of the cam into engagement between the two jaws so as to practically clutch the horizontal bar 158 and the vertical bar 159 together for the purposes hereinafter stated. This clutches together the entrance mechanism and the exit mechanism for the route whose shaft has been turned. The passage of a train over the entrance mechanism then causes a shifting of the horizontal bar 158 to the right. This, through the intermediation of the jaws and ball, throws the vertical bar 159 down and throws the free end of the lever 164 up into a locking notch of the cam so as to absolutely prevent further manipulation of the route key; the parts being located in this position, as hereinafter described, until the train operates the exit mechanism.

The entrance mechanism is shown in the lower left-hand part of Fig. 22 and in Fig. 23. The rope 118, which for the sake of simplicity and clearness has been shown in the previous figures as a continuous rope, is in fact in two parts, 118 and 118ª, the former running from the signal motor 114 to a pedal mechanism below described, and the latter running from said pedal mechanism to the signal arm 136. The pedal mechanism is similar in operation to what are known as slot mechanisms, whereby a connection between two parts of a signal-operating rope or rod may be released and regained. The long and short arms 167 and 168 are mounted to rotate independently about a common axis. The former is pulled by the counterweight 137 of the signal acting through the rope section 118ª, and the latter is pulled in the same direction automatically, as by a counterweight 169 on the end of a pivoted arm 170. In Fig. 22 the two arms 167 and 168 are supposedly latched to each other. Therefore, when pressure is withdrawn from the motor 114 the two arms 167 and 168 will swing to the left together, the switch automatically shifting to the "danger" position. Then when the motor 114 is actuated the pull on the rope section 118 will be transmitted through the arms 168 and 167 to the rope section 118ª and the signal will be pulled down to "safety." Pressure will be maintained in the motor 114 as long as the route shaft remains in its advanced position, and the rope section 118 and arm 168 will be held as shown. But the latch between the arms 167 and 168 is adapted to be withdrawn when a train passes over a pedal 171 adjacent to the rail, this pedal being mounted on a rock shaft 172 extending to the latch. When a train passes, therefore, the arms being unlatched, the rope 118 holds the arm 168, but the signal weight pulls the arm 167 to the position of Fig. 23. Thus the signal goes to "danger." It may be explained here that the subsequent release of the motor 114 from the cabin will slack the rope 118 and the weight 169 will pull the arm 168 to the left, where it will automatically latch with the arm 167; so that the next operation of the motor will pull the two arms again to the position of Fig. 22 and will pull the signal to "safety."

Connected with the arms 167 and 168 are the two terminals of a switch indicated diagrammatically at 173, one lead from which switch passes through a battery 174, thence through a switch 175 of the mercury type, thence through a solenoid 176, and through wire 177 to the opposite pole of the pedal mechanism. When the arms 167 and 168 are latched the electric switch 173 is open. When the connection between the arms 167 and 168 is broken (as in Fig. 23) the electric switch 173 is closed. The solenoid and immediately related parts, indicated as a whole by the numeral 20, are located in the cabin immediately below the route shafts, while the pedal mechanism described is located close to the signal. When the solenoid 176 is energized it pulls its core upward and thus pushes up the rod 178 which is connected to the rod 21 for transmitting the resulting movement to the levers 162 and horizontal bar 158, by which the balls and the clutch jaws are actuated to throw down the vertical bar 159 and lock the route shaft by means of the lever 164, this being the position shown in Fig. 22. The vertical bar 159 is locked in this position by a spring bolt 179 which enters a slot in the lower portion thereof; the rod 21 may be dropped afterward without breaking the lock of the route shaft established by its upward movement, the jaw and ball clutch being adapted to transmit movement of bar 158 in only one direction. At the end of the upward movement of the rod 178 a block 180 thereon strikes an arm of the electric switch 175 and opens such switch, thus breaking the circuit through the solenoid and allowing the rod 21 to drop. At the end of the falling movement of the rods 21 and 178 a block 181 on the latter strikes the electric switch 175 and restores it to closing position.

On the exit end of the route the signal already stands at "danger", and the train-controlled exit mechanism is not connected with the signal since no operation of the latter is required. A latch mechanism, however, similar to that at the entrance end, is used for controlling the circuit of a solenoid 182 within the cabin, the energizing of which withdraws the bolt 179 from the vertical bar 159 against the pressure of a spring 183. The motor 114ᵃ carries a rope 184 running to the short arm 185 of the latching mechanism which is normally latched to the long arm 186, the two arms being drawn toward the left by means of weights on the ends of levers, as indicated at 187 and 188. A pedal 189 controls the unlatching of the two arms as for the similar mechanism at the entrance end of the route. The motor 114ᵃ is identical with those used for operating the signals, but does not operate anything except the latching device. It is controlled by pressure coming through a conduit 190 from a valve 16ᵃ located in the cabin, and of identical construction with the valve 16 for controlling the signals hereinbefore described. The plunger of this valve 16ᵃ, when lowered, admits water under pressure from a conduit 191 through conduit 190 to operate the motor and pull the rope 184. This takes place when the bar 159 is lowered. Normally, however, this bar is raised and the piston of the valve 16ᵃ effects communication between the conduit 190 and an exhaust port 192, and the rope 184 is slacked to pick up the connection of the arm 185 with the arm 186. The electric circuit comprises a battery 194, wire 195, switch 193, wire 196, a continuous rail 197, wire 198, solenoid 182, wire 199, an insulated rail section 200, and a wire 201 leading to the opposite terminal of the battery.

The bolt 179 is normally withdrawn with its end pressed against the lower portion of the raised bar 159, and the rod 178 of the entrance mechanism is down, the circuits through both the entrance and exit mechanisms being broken at the respective pedal-controlled switches 173 and 193. The turning of the route shaft C P as shown, has thrown the signal at C to "safety" and has clutched the entrance bar 158 of the interlocking mechanism with the exit bar 159 by the action of the cam and ball, as above explained. The turning of the route shafts and their cams has no direct effect on the levers 162 and 164, these being merely cam-locking levers. The entering train strikes the pedal 171, releases the rope section 118ᵃ, causing the signal to return to "danger", and at the same time closes the electric switch 173, which completes the circuit of the solenoid 176, which forces the rod 21 upward, shifts the jaw 163 for route C P to the left, throws upward the corresponding jaw 165, and throws down the vertical bar 159. This throws the locking lever 164 into locking engagement with the cam on the route shaft. The bolt 179 springs into the slot in the bar 159 and locks it. The piston of the valve 16ᵃ is pressed down, the motor 114ᵃ is operated, and the two arms 185 and 186 are pulled to the right against the tendency of weights 187 and 188. This puts this pedal-controlled mechanism in position for operation when the train arrives at the exit end. The position of parts thus described is maintained as long as the train is within the section C P.

When the train reaches the exit end of the route its front wheel depresses the pedal 189, which unlatches the arms 185 and 186, allowing the latter to be pulled to the left so as to close the electric switch 193. This completes the circuit through the solenoid. But as long as the train is passing over the insulated section 200 of the rail, the battery 194 is short-circuited by the axles thereof and the solenoid will not operate. When the rear end of the train passes beyond the insulated section 200 this short circuit no longer exists, and then for the first time the battery will operate the solenoid 182 and withdraw the bolt 179, releasing the vertical bar 159. When this bar is released from the bolt 179 the route shaft for C P can be turned, backward or forward, the shape of the notch in which the end of the lever 164 enters being such that the cam can force down the lever as soon as the latter is free from control by the locking bolt 179.

After the train has passed, the route key will ordinarily be returned to its position of rest. This will lift the bar 159, reversing the valve 16ª, releasing the pressure in the motor 114ª, and slacking the rope 184; which will allow the arm 185 of the pedal mechanism to pick up its connection with the arm 186 so as to be ready for the next operation, and this will open the electric switch 193, releasing the pull of the solenoid 182 and allowing the bolt 179 to be pressed by its spring against the vertical bar 159 also ready for the next operation. The return of the route key also relieves the pressure on the motor 114 of the entrance signal and allows the restoration of the pedal mechanism to its latched position, in which the electric circuit is broken. A subsequent operation of the same route key, however, by admitting pressure to the motors 114 and 114ª, will pull their ropes and will swing the two latched arms of the pedal mechanisms to the right, as shown in the drawing, so that they are in position for the train-controlled operation just described.

When the rod 21 is permanently lowered, by the return of the key, the stop 181 will strike the mercury switch 175 and close the latter, as previously explained. The coincident release of the motor 114 and of the arm 168 of the latching device will break the contact at 172 and 173, so that the circuit of the solenoid 176 will remain open. The pedal 171 will not rise again into the path of the train wheels (by reason of its construction hereinafter described), until the signal has again been operated to "safety", bringing the parts to the position of Fig. 22.

Figure 24:
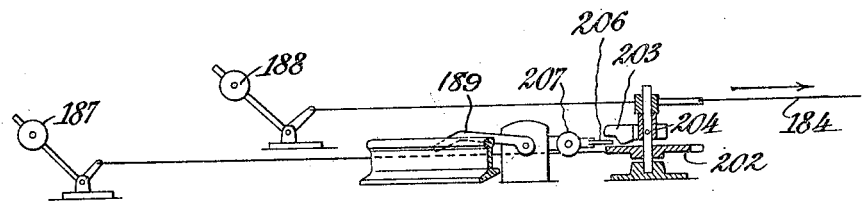
Figs. 24, 25 and 26 are respectively a side elevation, plan and detail of a train-controlled latching mechanism.
Figure 25:
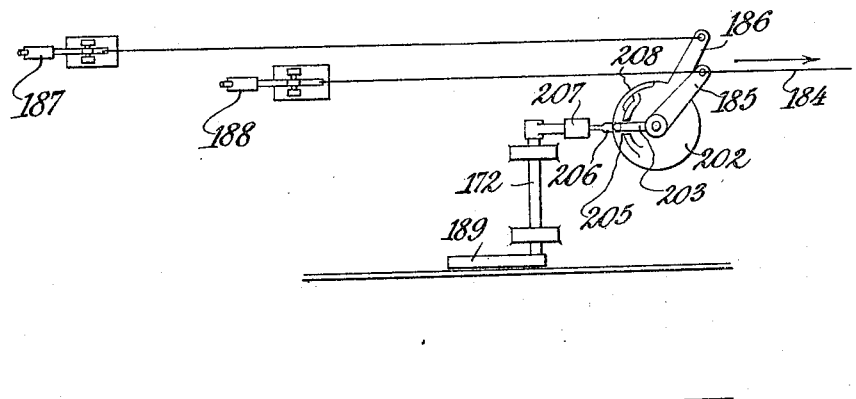
Figure 26:
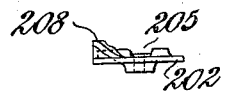

The construction of one of the latching devices, that for the exit mechanism for example, is shown in Figs. 24, 25 and 26. The arm 185 is pivoted on the base and the arm 186 is mounted on a plate 202 which pivots about the shaft of the shorter arm. The shorter arm 185 has mounted on its supporting shaft a locking arm 203 which is carried on a transverse pivot pin 204 and is adapted to fall into a notch 205 on the plate 202 to latch the two arms together. In the latched position of the parts shown there is a lifting arm 206 lying under the end of the arm 203 and normally held down by a counterweight 207, the arm 206 being keyed on the end of the rock shaft 172 which carries at its opposite end the treadle 189 adjacent to the track rail. When the treadle is depressed the arm 206 rises and lifts the latching arm 203 so that, notwithstanding the pull on the rope 184 and the holding of the short arm 185, the long arm 186 is released and turns to the left, carrying with it the notched plate 202. To reconnect the arms it is only necessary to release the pull on the rope 184, whereupon the arm 185 is swung to the left by its weight 188 so as to bring the latching arm 203 over the position assumed by the notch 205, into which notch the latching arm will drop. A subsequent pull on the rope 184 will therefore bring the two arms around to the right-hand position again ready for the next operation by the train.

The passage of the first wheel of the train depresses the treadle. In order to prevent a repetition of such operations on the treadle the latter is held down by means of a supplementary cam 208 on the disk 202, which, upon the release of the plate and arm 186 and the swinging of the latter to the left, passes under the end of the unlocking arm 206 and lifts it, notwithstanding its counterweight, and thus holds the treadle down. It is only when the parts are re-latched by releasing the pull on the rope 184, and are then pulled again to the right by again pulling the rope 184, that the cam 208 passes from under the unlatching arm 206 to the position shown in Fig. 25 and releases the latter so that its counterweight 207 can again lift the treadle 189.

The operations of the several parts of the system having been described in detail, it will only be necessary to refer briefly to the operation of the system as a whole.

When a train arrives and is to be sent along a certain route, the operator turns the corresponding key. For trains coming from one direction, or "down" the line, the key will be turned toward the left to bring it to its horizontal position. The first movement of the key locks the keys which control switches on all interfering routes and throws all the switches on the desired route to the right or left, as required, and the switches send a return-indication to the cabin; or where a switch was already in the desired position this switch also sends a return-indication. The first movement of the key does not affect the signals. But as soon as return-indications have been received from the switches the key may be advanced farther and at the very end of its stroke will shift the route signal at the entrance, where the train is coming, to "safety", making no other change in the signals. This signal-setting movement of the route key locks the keys of all routes having their entrance at the same point, so that the signal which has been set at "safety" cannot be interfered with by any other route key. After its full advance the route key can be turned back. The very first backward movement, however, will cause the entrance signal to be shifted again to "danger"; and it is only after such a shift of the entrance signal that the other route keys which control this signal are released in the interlocking mechanism. Consequently, it is only after the route key has turned back sufficiently to reverse the entrance signal from "safety" to "danger" that the key can be moved back to its starting point and thus unlock the keys which control switches on interfering routes.

Finally, after the correct setting of the switches and the setting of the entrance signal at "safety", there is a certain control by the train to prevent rear-end collision or improper manipulation of the switch keys. A rear-end collision is prevented by the throwing of the entrance signal to "danger" as soon as the train passes it. At the same time the key of the route on which the train is running is locked, so that it cannot return the entrance signal to "safety" and thus permit the entrance of another train on the same route. It is only when the last car of a train has passed out of the route at the exit end that the key of this route is released; whereupon it can be turned backward in the manner previously explained.

What we claim is:

1. Apparatus for controlling railway switch points and signals comprising a casing, mechanical devices for controlling the operation of the points and signals, mechanical devices for locking the first named mechanical devices, the said mechanical devices being mounted in parallel planes within the casing, shafts adapted to be turned and extending through the said parallel planes and devices carried by the said shafts adapted to operate the said mechanical devices and means controlled by said mechanical devices for locking said shafts.

2. Apparatus for controlling railway switches comprising a casing, shafts mounted to turn in said casing, keys adapted to turn said shafts, each key corresponding with the switches of a certain route, sets of levers mounted in parallel planes at right angles to said shafts, rods connecting the levers of each set, a device for controlling the operation of the switches, the said connecting rods being adapted to be moved when any one of said levers of the set is moved and to transmit this movement to the said device, and cams mounted on said shafts and adapted to turn said levers.

3. Apparatus for controlling railway switch points and signals comprising a casing, sets of levers mounted in parallel planes within the casing, shafts extending through the said parallel planes, keys adapted to turn the said shafts and projecting from the face of the casing, cams mounted on the said shafts and situated respectively in the parallel planes containing the sets of levers, rods connecting the levers of one set so that when any one lever is turned all the levers of the set are turned, the said levers being so arranged relatively to the cams that turn them and the cams being so shaped that when one lever is turned by one cam the remaining cams and levers are locked as regards the reverse movement.

4. Apparatus for controlling railway switch points and signals comprising a casing, mechanical devices for controlling the operation of the points and signals, mechanical devices for locking the first named mechanical devices, the said mechanical devices being mounted in parallel planes within the casing, shafts adapted to be turned and extending through the said parallel planes and devices carried by the said shafts adapted to operate the said mechanical devices.

5. Apparatus for controlling railway switches comprising a casing, shafts mounted to turn in the said casing, keys adapted to turn the said shafts, each key being contained in a division on the face of the casing which division is at the point of intersection of lines at right angles to each other and corresponding with the route controlled by the key, sets of levers mounted in parallel planes at right angles to the said shafts, rods connecting the levers of each set, a device for controlling the operation of the switch points, the said connecting rods being adapted to be moved when any one of the levers of the set is moved and to transmit this movement to the said device for controlling the operation of the switch points and cams mounted on the said shafts and adapted to turn the said levers.

6. Apparatus for controlling railway switch points and signals comprising a casing, sets of levers mounted in parallel planes in the said casing, rods connecting the said levers of each set, keys adapted to operate the said levers, a device situated at the entrance of the section of the track controlled by each key, which device is adapted to be operated by a passing train and devices whereby the operating of the said device locks the levers in the said casing in such a manner that none relating to that section of track can be operated so long as the train is within the section.

7. Apparatus for controlling railway switch points and signals comprising a casing, sets of levers mounted in parallel planes in the said casing, rods connecting the said levers of each set, keys adapted to operate the said levers, a device situated at the entrance of the section of the track controlled by each key, which device is adapted to be operated by a passing train and devices whereby the operation of the said device locks the levers in the said casing in such a manner that none relating to that section of track can be operated so long as the train is within the section, a like device adapted to be operated by a passing train at the exit of the said section and devices whereby the operation of the last named devices is caused to unlock the said levers.

8. Apparatus for controlling railway switch points and signals comprising operating devices for the several switches and signals of a network of tracks, route keys, each arranged to set all the switches for a given route, and means at the entrance of each route adapted to be operated by a passing train and to lock said operating devices for all switches on the route set.

9. Apparatus for controlling railway switch points and signals comprising operating devices for the several switches and signals of a network of tracks, route keys, each arranged to set all the switches for a given route, and means at the entrance of each route adapted to be operated by a passing train and to lock said operating devices for all switches on the route set, and means at the exit of each route adapted to be operated by a passing train and to unlock said operating devices.

In witness whereof we have hereunto signed our names this 17th day of April 1908, in the presence of two subscribing witnesses.

ALFRED MONARD.
ERNEST ALBERT MOUTIER.
HORACE DUMARTIN.

Witnesses:
  H. C. COXE,
  GABRIEL BELLIARD.

Copies of this patent may be obtained for five cents each, by addressing the "Commissioner of Patents, Washington, D. C."